US008909158B2

(12) United States Patent
O'Connor et al.

(10) Patent No.: US 8,909,158 B2
(45) Date of Patent: Dec. 9, 2014

(54) AIRCRAFT COMMUNICATION SYSTEM

(75) Inventors: Daniel O'Connor, Ennetmoos (CH); Bruno Cervia, Buochs (CH); Robert Milns, Buochs (CH); Paul Gibson, Alpnachstad (CH)

(73) Assignee: Pilatus Flugzeugwerke AG, Stans (CH)

( * ) Notice: Subject to any disclaimer, the term of this patent is extended or adjusted under 35 U.S.C. 154(b) by 452 days.

(21) Appl. No.: 13/451,941

(22) Filed: Apr. 20, 2012

(65) Prior Publication Data

US 2012/0214420 A1    Aug. 23, 2012

Related U.S. Application Data

(63) Continuation of application No. PCT/EP2009/063931, filed on Oct. 22, 2009.

(51) Int. Cl.
*H04W 80/02*    (2009.01)

(52) U.S. Cl.
USPC ............... 455/66.1; 342/30; 342/36; 342/37; 342/455; 340/961; 370/316; 701/301

(58) Field of Classification Search
CPC .... G08G 5/0013; G08G 5/0021; G01S 13/91; G01S 1/02
USPC ........................................................ 455/66.1
See application file for complete search history.

(56) References Cited

U.S. PATENT DOCUMENTS

| | | | |
|---|---|---|---|
| 6,271,768 B1 * | 8/2001 | Frazier et al. ................. 340/961 |
| 6,278,396 B1 * | 8/2001 | Tran ................................ 342/29 |
| 6,459,411 B2 * | 10/2002 | Frazier et al. ................. 342/455 |
| 6,469,660 B1 * | 10/2002 | Horvath et al. ............... 342/179 |
| 6,542,810 B2 * | 4/2003 | Lai ................................ 701/120 |
| 6,573,858 B1 * | 6/2003 | Fung et al. ....................... 342/36 |
| 6,681,158 B2 * | 1/2004 | Griffith et al. ..................... 701/3 |
| 6,690,296 B2 * | 2/2004 | Corwin et al. ................. 340/961 |
| 6,718,236 B1 * | 4/2004 | Hammer et al. ................... 701/3 |
| 6,744,396 B2 * | 6/2004 | Stone et al. ...................... 342/36 |
| 6,806,829 B2 * | 10/2004 | Smith et al. .................... 342/456 |
| 6,808,141 B2 * | 10/2004 | Bretscher et al. ........... 244/76 R |
| 6,810,322 B2 * | 10/2004 | Lai ................................ 701/120 |
| 6,950,037 B1 * | 9/2005 | Clavier et al. ................. 340/945 |
| 6,963,291 B2 * | 11/2005 | Holforty et al. .............. 340/945 |

(Continued)

FOREIGN PATENT DOCUMENTS

WO    WO 2008/134255 A2    11/2008

OTHER PUBLICATIONS

International Search Report from International Application No. PCT/EP2009/063931.

(Continued)

*Primary Examiner* — Hai V Nguyen
(74) *Attorney, Agent, or Firm* — McCarter & English LLP (57) ABSTRACT

An aircraft communication system and corresponding method for establishing a datalink network between participating aircrafts, wherein each participating aircraft comprises a datalink transponder for sending and receiving standard communication messages (M) over a standard communication protocol; said datalink transponders are employed for establishing said datalink network using a standard communication protocol, and wherein said datalink transponders transmitting event driven messages (M) with a predefined structure identifying said messages (M) as test messages (TM) and at the same time comprising message data (MD) for establishing said datalink network, thus providing a datalink network established by transmission of solely messages (M) compliant with said standard communication protocol.

14 Claims, 6 Drawing Sheets

(56) References Cited

U.S. PATENT DOCUMENTS

| | | | |
|---|---|---|---|
| 6,967,616 B2 * | 11/2005 | Etnyre | 342/182 |
| 7,126,534 B2 * | 10/2006 | Smith et al. | 342/456 |
| 7,148,816 B1 * | 12/2006 | Carrico | 340/961 |
| 7,383,124 B1 * | 6/2008 | Vesel | 701/517 |
| 7,385,527 B1 * | 6/2008 | Clavier et al. | 340/945 |
| 7,414,567 B2 * | 8/2008 | Zhang et al. | 342/29 |
| 7,429,950 B2 * | 9/2008 | Smith et al. | 342/456 |
| 7,437,250 B2 * | 10/2008 | Breen et al. | 702/34 |
| 7,511,660 B2 * | 3/2009 | Damidaux et al. | 342/357.45 |
| 7,570,214 B2 * | 8/2009 | Smith et al. | 342/463 |
| 7,576,695 B2 * | 8/2009 | Smith et al. | 342/465 |
| 7,612,716 B2 * | 11/2009 | Smith et al. | 342/454 |
| 7,616,149 B2 * | 11/2009 | Powers et al. | 342/36 |
| 7,619,555 B2 * | 11/2009 | Rolfe | 342/29 |
| 7,730,307 B2 * | 6/2010 | Viggiano et al. | 713/168 |
| 7,739,167 B2 * | 6/2010 | Breen et al. | 705/35 |
| 7,755,532 B2 * | 7/2010 | Dooley | 342/36 |
| 7,876,259 B2 * | 1/2011 | Schuchman | 342/37 |
| 7,889,133 B2 * | 2/2011 | Smith et al. | 342/450 |
| 7,908,077 B2 * | 3/2011 | Smith et al. | 701/120 |
| 7,956,795 B2 * | 6/2011 | Bruno et al. | 342/36 |
| 7,965,227 B2 * | 6/2011 | Kozhevnikov et al. | 342/145 |
| 8,004,452 B2 * | 8/2011 | Rolfe et al. | 342/37 |
| 8,063,816 B2 * | 11/2011 | Troxel | 342/30 |
| 8,072,382 B2 * | 12/2011 | Smith et al. | 342/387 |
| 8,102,301 B2 * | 1/2012 | Mosher | 342/36 |
| 8,120,525 B2 * | 2/2012 | Ridenour et al. | 342/30 |
| 8,160,809 B2 * | 4/2012 | Farwell et al. | 701/412 |
| 8,169,357 B2 * | 5/2012 | Bruno et al. | 342/36 |
| 8,220,038 B1 * | 7/2012 | Lucchesi et al. | 726/9 |
| 8,253,622 B2 * | 8/2012 | Hampel et al. | 342/147 |
| 8,314,719 B2 * | 11/2012 | Grothe | 340/961 |
| 8,344,936 B2 * | 1/2013 | Stayton | 342/36 |
| 8,437,956 B2 * | 5/2013 | Limbaugh et al. | 701/485 |
| 8,446,321 B2 * | 5/2013 | Smith | 342/465 |
| 8,538,603 B2 * | 9/2013 | O'Connor et al. | 701/3 |
| 8,548,727 B2 * | 10/2013 | Kauffman et al. | 701/301 |
| 8,559,971 B1 * | 10/2013 | Garcia et al. | 455/456.1 |
| 8,570,990 B2 * | 10/2013 | Kauffman | 370/338 |
| 8,604,965 B2 * | 12/2013 | Jennings et al. | 342/37 |
| 8,639,401 B2 * | 1/2014 | Bailey et al. | 701/14 |
| 8,643,534 B2 * | 2/2014 | Margolin | 342/30 |
| 8,665,985 B1 * | 3/2014 | Piesinger | 375/268 |
| 8,700,306 B2 * | 4/2014 | Duggan et al. | 701/301 |
| 8,791,861 B2 * | 7/2014 | Garcia et al. | 342/464 |
| 8,811,265 B2 * | 8/2014 | Horvath | 370/316 |
| 2002/0011950 A1 * | 1/2002 | Frazier et al. | 342/357.08 |
| 2002/0154061 A1 * | 10/2002 | Frazier et al. | 342/455 |
| 2003/0004641 A1 * | 1/2003 | Corwin et al. | 701/301 |
| 2003/0052224 A1 * | 3/2003 | Bretscher et al. | 244/65 |
| 2006/0191326 A1 * | 8/2006 | Smith et al. | 73/73 |
| 2006/0287781 A1 * | 12/2006 | Bui | 701/3 |
| 2007/0132638 A1 * | 6/2007 | Frazier et al. | 342/455 |
| 2007/0159378 A1 * | 7/2007 | Powers et al. | 342/29 |
| 2007/0282492 A1 * | 12/2007 | Valovage et al. | 701/3 |
| 2009/0027254 A1 * | 1/2009 | Troxel | 342/30 |
| 2009/0195436 A1 * | 8/2009 | Ridenour et al. | 342/30 |
| 2009/0322587 A1 * | 12/2009 | Stayton | 342/37 |
| 2011/0001653 A1 * | 1/2011 | Troxel | 342/30 |
| 2011/0001659 A1 * | 1/2011 | Hampel et al. | 342/120 |
| 2011/0057830 A1 * | 3/2011 | Sampigethaya et al. | 342/36 |

OTHER PUBLICATIONS

International Preliminary Report on Patentability for International Application No. PCT/EP2009/063931.

* cited by examiner

1A123
▼15    FRIEND
 185

1A123
▼15    UNKNOWN
 185

1A123
▼15    FOE
 185

Table I.

| 10001 | CA:3 | AA:24 | ME:56 | PI:24 |
|---|---|---|---|---|

FIG. 6

Table II.

| "ME" Bit # | 1............5 | 6............8 | 9....................56 |
|---|---|---|---|
| Field Name | Type Identifier (TI) | Subtype Identifier (STI) | Message Data (MD) |
| Value | 23 | 0 | |

"TEST" Message (TM) (Type=23; Subtype=0)

FIG. 7

Table III.

| "ME" Bit # | 09..10 | 11.............32 | | | | | | | | | 33...56 | | |
|---|---|---|---|---|---|---|---|---|---|---|---|---|---|
| | | Status Data (SD) | | | | | | | | | ...56 Message Data (MD) | | |
| | | 11...14 | 15...20 | | | 21...32 | | | | | | Position Data (PD) | |
| | | | Friend Status (FS) | | | Foe Status (FoS) | | | | | 33...40 | 41...48 | 49...56 |
| | | | 15-16 | 17-18 | 19-20 | 21-23 | 24-26 | 27-29 | 30-32 | | | | |
| Field Name | Message identifier (MI) | Tactical Status (TS) | Friend A | Friend B | Friend C | Foe 1 | Foe 2 | Foe 3 | Foe 4 | | Latitude (Lat) | Longitude (Long) | Altitude (Alt) |
| Values | 00 = Tactical Data, Real | Killed, Chaff, Flares, Throttle | 0=None 1=Scan 2=Track 3=Lock | | | 0=None 1=Scan 2=Track 3=Launch 4=Active 5=Reserved 6=Reserved 7=Kill | | | | | | | |

AIRCRAFT COMMUNICATION SYSTEM

CROSS-REFERENCE TO RELATED APPLICATIONS

This application is a continuation of similarly-titled International Patent Application No. PCT/EP2009/063931, filed Oct. 22, 2009, designating the United States, the content of which is hereby incorporated by reference in their entirety as part of the present disclosure.

FIELD OF THE INVENTION

The present invention relates to an aircraft communication system and a corresponding method for establishing a datalink network between participating aircrafts.

BACKGROUND OF THE INVENTION

Various aircraft communication systems are known in the art, most of which being restricted to communication between a ground station and an aircraft or a one-to-one communication between aircrafts. With the development of advanced aircraft communication systems, there is an urgent need to allow multiple aircrafts, such as a fleet of aircrafts, to be able to be linked by a communication network. Some advanced communication systems do allow multi-point communication between aircrafts. However, because communication on standard communication channels/protocols is strictly regulated and non-compliant communication messages are not permitted, dedicated communication channels operating on non-standard frequencies and/or implemented on non-standard protocols are used by these systems. These systems have several disadvantages which makes their deployment costly and troublesome. First, the frequencies used by communication systems are strictly controlled by governmental agencies and thus the use of non-standard frequencies is dependent upon acquiring of the rights to use these frequencies. Further, deployment of aircrafts in the airspace of different countries makes the acquisition of these authorizations difficult, time-consuming and costly. Also, use of non-standard communication protocols requires the use of dedicated communication equipment, which considerably increases not only the costs of such systems, but also the testing/implementing time and also the weight of the aircraft. Furthermore, such additional equipment unnecessarily increases the complexity of the navigation system of the aircraft.

Special requirements for the communication system are set by aircrafts designed to provide tactical/training functionalities, such as simulation of additional navigation systems, weapon capabilities, radar displays and electronic warfare of a fighter jet for training purposes. These requirements become even more complex in training scenarios involving a fleet of such training aircrafts.

SUMMARY OF THE INVENTION

The objective of the present invention is thus to provide an aircraft communication system for establishing a datalink network between participating aircrafts that can be used without the need to obtain further authorizations for dedicated communication frequencies and/or protocols, does not require additional dedicated communication equipment and is flexible enough to accommodate the transmission of various types and amounts of data.

A further objective of the present invention is to provide an aircraft communication system for establishing a datalink network between participating aircrafts that provides a backbone for various simulated training features within a fleet of training aircrafts.

Furthermore, an objective of the present invention is to provide a method for establishing a datalink network between participating aircrafts that can be implemented without the need to obtain further authorizations for dedicated communication frequencies and/or protocols, can be implemented without additional dedicated communication equipment and is flexible enough to accommodate the transmission of various types and amounts of data.

An even further objective of the present invention is to provide a method for establishing a datalink network between participating aircrafts which allows various simulated training features to be implemented within a fleet of training aircrafts.

The above-identified objectives of the present invention are solved by an aircraft communication system for establishing a datalink network between participating aircrafts, wherein each participating aircraft comprises a datalink transponder for sending and receiving standard communication signals, said datalink transponders being employed for establishing said datalink network using a standard communication protocol and said datalink transponders transmitting event driven messages with a predefined structure identifying said messages as test messages and at the same time comprising data for establishing said datalink network, thus providing a datalink network established by transmission of solely messages compliant with said standard communication protocol.

Said further objectives of the present invention are solved by the aircraft communication system characterized in that said predefined structure of the messages comprises a field identifying the message as a test message; a message identifier identifying the message as a message generated by a corresponding aircraft communication system; and a field comprising message data.

The above-identified even further objectives of the present invention are solved by a method for establishing a datalink network between participating aircrafts, each participating aircraft comprising a datalink transponder for sending and receiving standard communication signals, method characterized in that said datalink transponders are employed for establishing said datalink network using a standard communication protocol; said datalink transponders transmit messages with a predefined structure identifying said messages as test messages and at the same time comprising data for establishing said datalink network; and wherein a datalink network is established by transmission of solely messages compliant with said standard communication protocol.

In view of the drawbacks of the prior art, the objective of the present invention and the inventive solution summarized above, the present invention has the main advantage that it provides an aircraft communication system and a corresponding method for establishing a datalink network between participating aircrafts which operates solely on standard communication protocols using "commercial off-the-shelf" communication equipment without violating the standard protocols. This has the direct advantages that costs for the development, testing and deployment of dedicated communication equipment is at least reduced if not completely eliminated. Also, no special authorizations are required to deploy the aircraft communication system of the present invention. In addition, due to the use of communication equipment already existent on the aircraft, there is no additional weight and complexity is not unnecessarily increased. Further, because messages transmitted by the aircraft communication system according to the present invention are identified as test messages of the standard communication protocol, transmissions within the aircraft communication system do not affect other transmissions based on the same communication protocol.

Due to the particular structure of the transmitted messages, an aircraft communication system for establishing a datalink network between participating aircrafts is provided that acts a backbone for various simulated training features within a fleet of training aircrafts.

DESCRIPTION OF EMBODIMENTS OF THE INVENTION

Certain terms will be used in this patent application, the formulation of which should not be interpreted to be limited by the specific term chosen, but as to relate to the general concept behind the specific term.

In the context of the present application, "training functionality" shall mean the functionalities of a training aircraft that relate to the training of a pilot/trainee in an emulated environment within the aircraft. The training functionalities further relate to tactical scenarios, simulated system failures, emulated warfare all these according to training syllabus.

The term "aircraft" shall mean in the context of the present application any kind of aircraft including recreational, civil, but especially training aircrafts providing tactical/training functionalities. "Host aircraft" shall mean the aircraft to which it is referred at that moment or the aircraft hosting something referred to in that context. It shall be any of the participating aircrafts.

Figure 1:
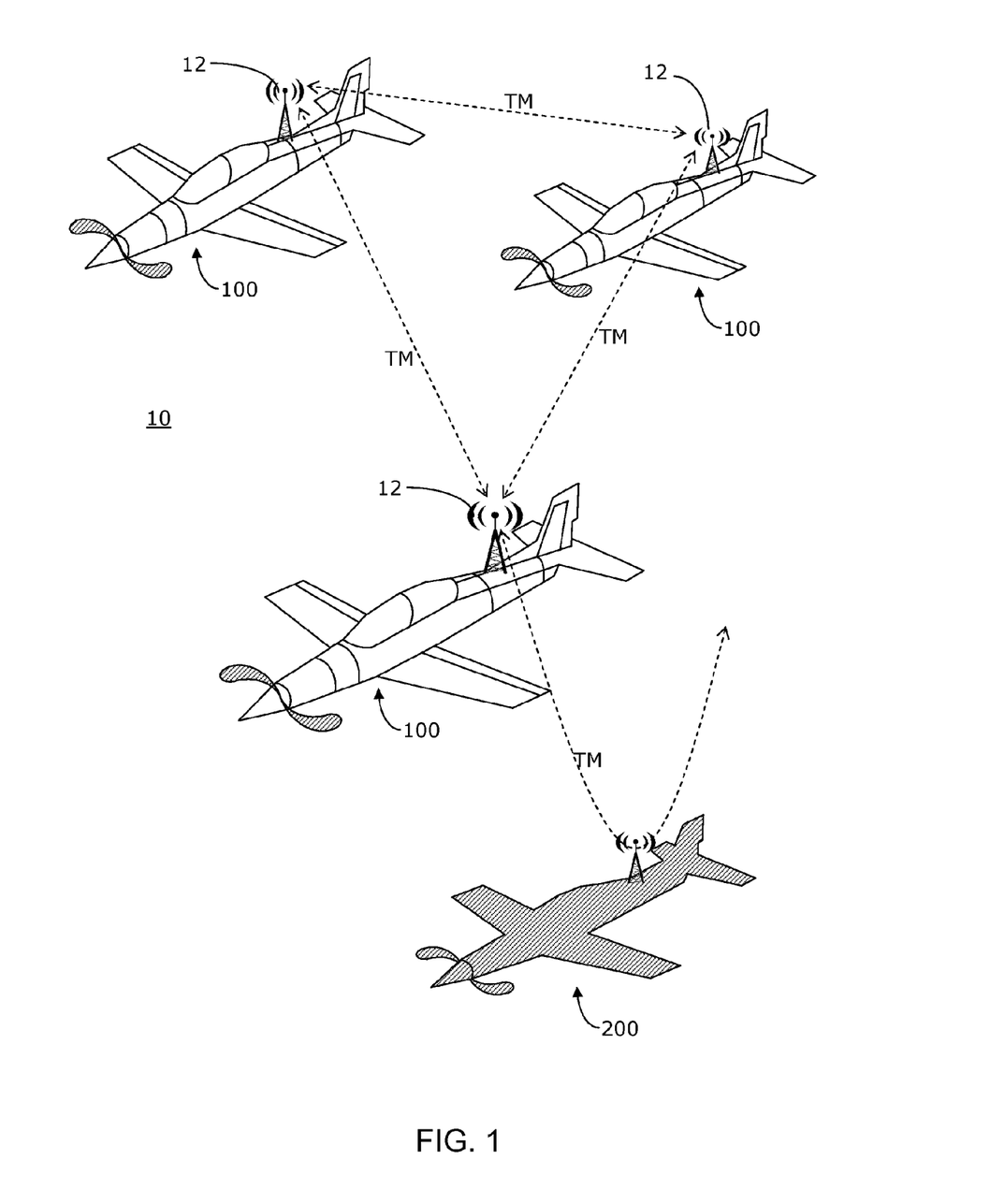
FIG. 1 is a symbolic diagram according to the present invention, depicting the aircraft communication system as deployed within a fleet of training aircrafts.

FIG. 1 shows a symbolic diagram depicting the aircraft communication system 10 as deployed within a fleet of training aircrafts 100. As seen in FIG. 1, each participating aircraft 100 comprises a datalink transponder 12 for sending and receiving standard communication signals. These datalink transponders 12 are employed for establishing a datalink network using solely a standard communication protocol. In one aspect, the datalink network is established by transmission of solely messages M compliant with said standard communication protocol in that said datalink transponders 12 transmit event-driven messages M with a predefined structure identifying said messages as test messages TM and at the same time comprising message data MD for establishing said datalink network. An exemplary predefined structure of the messages M will be explained in relation to Tables I to III, shown in FIGS. 6-8, in later paragraphs of this description. As messages identified as test messages TM, are discarded by the communication systems of non-participating aircrafts 200, the transmission of test messages TM by the datalink transponders 12 of participating aircrafts 100 will not violate the standard communication protocol and will not affect the communication systems of non-participating aircrafts 200. This aspect is allows the aircraft communication system 10 of the present invention to be deployed without the need for special authorizations or the need to reserve dedicated frequencies.

The use of a standard communication protocol and corresponding "commercial off-the-shelf" communication equipment lowers the costs for the development, testing and deployment of dedicated communication equipment. Furthermore there is no additional weight and complexity of the communication system of the aircraft 100 is not unnecessarily increased.

This datalink network is symbolically depicted in FIG. 1 with dashed lines and arrows illustrating that the datalink network may comprise duplex communication channels. A non-participating aircraft 200 is symbolically shown in FIG. 1 as hatched and the curved dashed line symbolizes the fact that messages identified as test messages TM are automatically disregarded by the communication systems of nonparticipating aircrafts 200, even if the communication systems of such aircrafts operate on the same communication protocol as the aircraft communication system 10.

The establishment of the datalink network is achieved by the use of messages M identified as test messages TM which have a predefined structure. This predefined structure allows the messages M to carry message data MD. This MD, transmitted over the datalink network processed, for example, by a mission computer MC, can provide a flexible and versatile network connecting participating aircrafts 100. An exemplary predefined structure of the messages M will be explained in relation to tables I to III, shown in FIGS. 6-8, in later paragraphs of this description.

In an embodiment, the standard communication protocol used for transmission of messages M by the datalink transponders 12 of the participating aircrafts 100 is the automatic dependent surveillance-broadcast ADS-B communication protocol. Automatic dependent surveillance-broadcast ADS-B is a function for airborne or surface aircraft, or other surface vehicles operating within the airport surface movement area, that periodically transmit their state vector (horizontal and vertical position, horizontal and vertical velocity) and other information. ADS-B is automatic because no external stimulus is required; it is dependent because it relies on onboard navigation sources and onboard broadcast transmission systems to provide surveillance information to other users.

Conventional automatic dependent surveillance-broadcast ADS-B Messages transmitted usually on 1090 MHz are the Mode S extended squitters comprising airborne position squitter, airborne velocity squitter, surface position squitter, etc., broadcast by a transponder. As mentioned already, the messages M transmitted by the datalink transmitters 12 of the present invention comprise additional message data MD conventionally not transmitted in ADS-B messages. According to the same embodiment, the datalink transmitters 12 can be "commercial off the shelf" 1090 MHz units which receive ADS-B messages (Mode-S extended squitter downlink format DF 17, 18 and 19) and provide unfiltered data to a mission computer MC using, for example, an Ethernet 10baseT interface. The datalink network utilizes Airborne Dependent Surveillance—Broadcast ADS-B transponder squitters of Global Positioning System GPS data and Air Data Computer ADC air data. Additional position updates are provided in tactical status training messages squittered by the transponder 12 for simulated Datalink purposes. These messages M are implemented using the ADS-B "Test" message TM.

ADS-B "Test" messages are the industry-standard Type 23 messages, conventionally used only for test purposes, i.e., solely for the broadcast of information in support of bench and/or certification testing of ADS-B systems or for the broadcast of information of interest only to local ADS-B ground applications. Conventionally, "Test" message broadcasts will not result in an ADS-B report being generated onboard any other ADS-B equipped aircraft, nor is the specific information being included in the "Test" message expected to be generally codified within internationally accepted standards, and "test" messages containing information of interest only to local ADS-B ground applications are intended to be used in support of technical or operational evaluations, or in support of local operational equipment.

Contrary to the above-defined conventional use of "test" messages, when the Datalink is engaged, the mission computer MC also formats event driven squitter messages M for transmission by the datalink transponder 12 to enable a limited amount of data to be transferred between participating aircrafts 100 for tactical training purposes in the form of message data MD.

Figure 2:
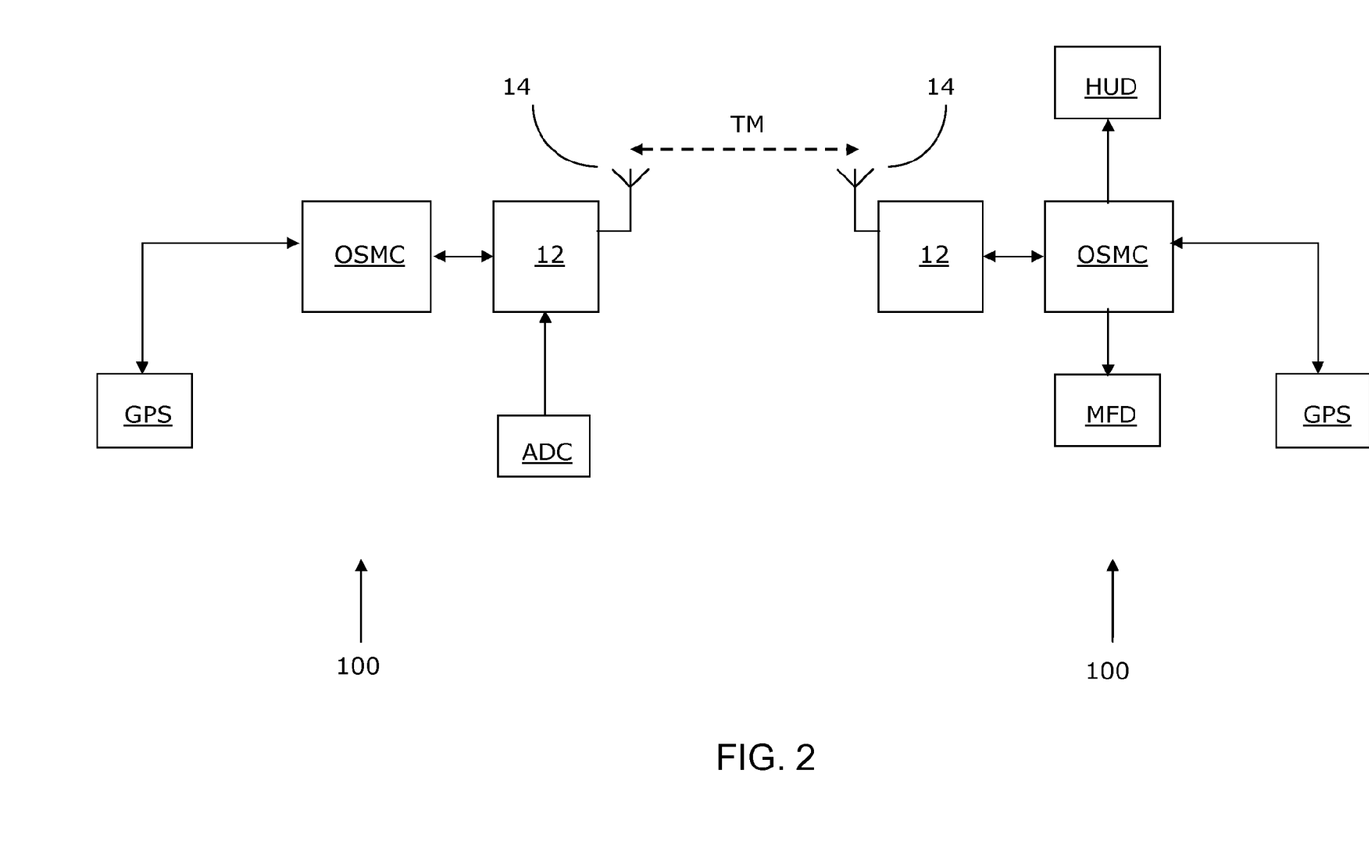
FIG. 2 is a schematic block diagram depicting an embodiment of the aircraft communication system according to the present invention.

FIG. 2 presents a schematic block diagram depicting an embodiment of the architecture of the aircraft communication system 10 for establishing a datalink network between participating aircrafts 100.

The aircraft communication system 10 comprises datalink transponders 12, which may be commercial "off-the shelf" 1090 MHz units for receiving/transmitting ADS-B messages and provide unfiltered data to a mission computer MC that controls all tactical/training communications within the aircraft communication system 10. The mission computer MC has the further function of filtering the unfiltered data from the datalink transponders 12 followed by a processing of message data MD contained within messages identified as such and computing information to be displayed on multi-function displays MFD connected to it. Optionally, a heads-up display HUD may also be provided alongside the multi-function display MFD. Furthermore, the mission computer MC processes data from a GPS and an air data computer ADC module connected to it and passes this processed data to be transmitted by the datalink transponder 12. Thus squitters of Global Positioning System GPS data and Air Data Computer ADC air data are transmitted over the datalink network. Additional position updates are provided in tactical status TS fields of the message data MD squittered by the transponder 12 for simulated Datalink purposes.

Each datalink transponder 12 is connected to a corresponding antenna 14 providing appropriate coverage. The datalink transponder 12 includes two separate channels and operates in diversity mode, and both a top antenna and a bottom antenna may be provided for best coverage. When the aircraft operates on the ground, the communication is only through the top antenna.

In a further embodiment, the aircraft communication system 10 is also connected to the flight management system FMS of the aircraft which sets a flight ID to be broadcast by the datalink transponder 12 in the ADS-B message M. The flight ID is used to classify the aircraft. The flight ID set by the flight management system FMS may comprise a fleet ID and a mission ID that uniquely identify the aircraft 100. The fleet ID is a unique identifier for the customer's fleet. The mission ID is a unique identifier for the aircraft 100 within the training mission and shall consist of two subfields: group ID and member ID. Group ID defines the aircraft's tactical group. Member ID defines the member within the group. Foe designated aircrafts are selected on a setup page called "Datalink Setup," for example, on the multi-function display MFD. Only flight IDs containing the fleet ID are displayed here to prevent aircraft from a different fleet interfering. Foe designated aircrafts are then selected according to group ID.

Figure 6:
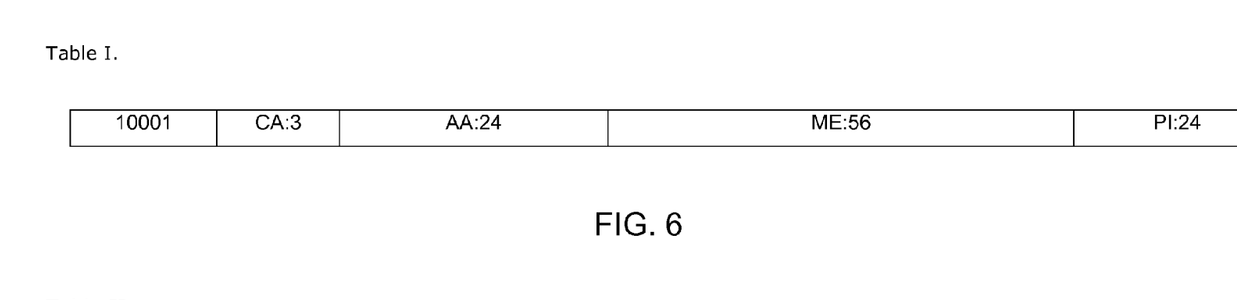
FIG. 6 is a table illustrating the basic structure of an exemplary message M complying with the ADS-B communication protocol.
Figure 7:
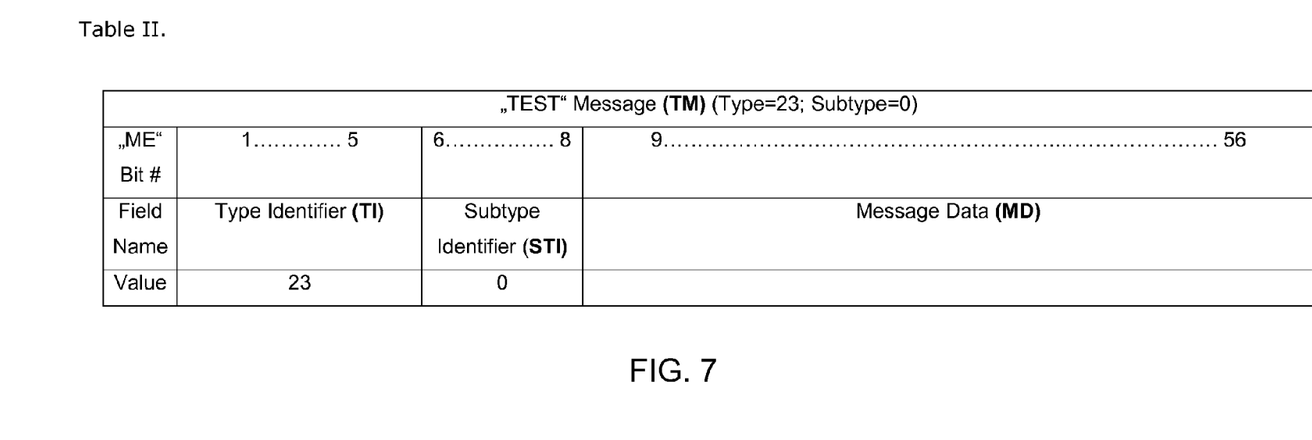
FIG. 7 is a table illustrating an exemplary structure of a message ME designated as a test message TM.
Figure 8:
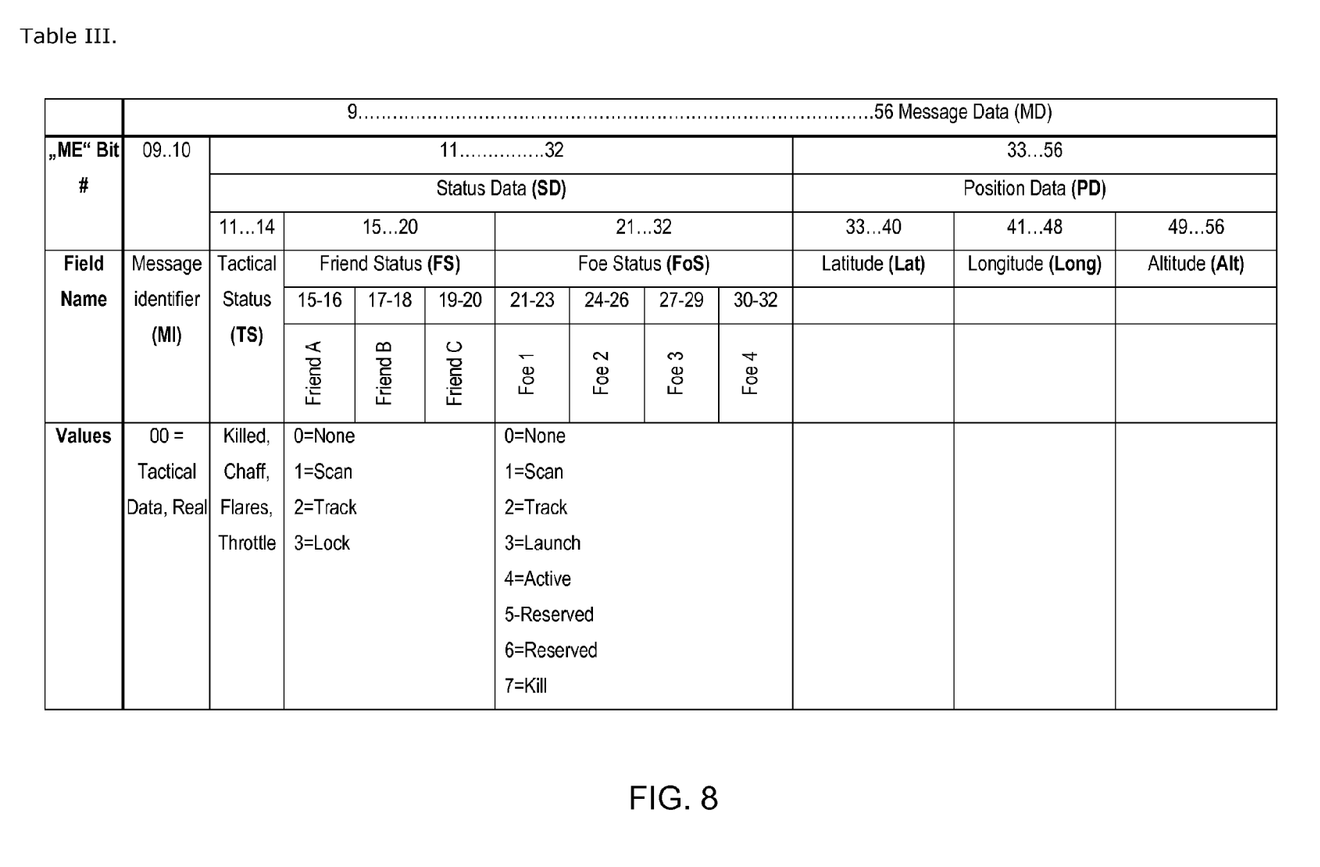
FIG. 8 is a table illustrating the structure of the message data MD within a test message TM.

In FIGS. 6-8, tables I to III present an exemplary predefined structure of the event driven messages M transmitted by the datalink transponders 12 of the participating aircrafts 100, this predefined structure providing numerous tactical/training features to be implemented based on the established datalink communication network.

In FIG. 6, table I shows the basic structure of an exemplary message M complying with the ADS-B communication protocol. The first field, comprising five bits, is set to the value 17, identifying the message M as a Down Link 17 type message. The 56 bit message ME field is used to transmit broadcast messages.

In FIG. 7, table II presents an exemplary specific structure of a message ME designated as a test message TM. The type identifier TI field identifies the message M as a test message TM. In this ADS-B embodiment, the type identifier TI is set to the value 23 which designates the message M as an ADS-B Type 23 "Test" message as required by the ADS-B protocol. The message ME shown in Table II further comprises a subtype identifier STI for indicating the subtype of the message. In the ADS-B embodiment the subtype identifier STI is usually set to 0. The last field of the message ME is the field called message data MD which carries all the useful data for establishing the datalink network between participating aircrafts 100.

In FIG. 8, table III details the structure of the message data MD within a test message TM. In the exemplary embodiment of the predefined structure of the test message TM, the message data MD comprises the following fields:

Message identifier MI: Bits 09 . . . 10 of the message ME are set to 00 and identify the message as being "Tactical Data, Real";

Status Data SD: comprising the subfields:
Tactical status TS: defines the tactical status may comprise 4 subfields in the following order: Killed, Chaff, Flares, and Throttle;
Friend Status FS: defines the status of friend designated entities/aircrafts 100 as seen by the host's radar/weapon system. The state of each friend entity/aircraft 100 may be defined by the following values: O=None; 1=Scan; 2=Track; 3=Lock
Foe status FoS: defines the status of foe designated entities/aircrafts 100 as seen by the host's radar/weapon system. The state of each foe entity/aircraft 100 may be defined by the following values: O=None; 1=Scan; 2=Track; 3=Launch; 4=Active; 5—Reserved; 6=Reserved; 7=Kill Position data PD: Supplement the normal ADS-B Airborne/Surface Position messages and define the host aircrafts 100 current position, e.g., to the nearest minute of arc and altitude to the nearest 25 ft.
Latitude Lat: contains the unsigned decimal portion of the hosts Latitude minutes, e.g., rounded to the nearest 0.00390625 minutes;
Longitude Long: contains the unsigned decimal portion of the hosts Longitude minutes, e.g., rounded to the nearest 0.00390625 minutes;

Altitude Alt: contains the unsigned remainder of the hosts uncorrected barometer altitude, e.g., after division by 6400 ft. and rounding to the nearest 25 ft.

This predefined structure of the message M provides the medium for transferring data between participating aircrafts 100 for establishing the datalink communication network.

In the following paragraphs, features will be presented which are made possible by the inventive datalink communication network using the messages M having the predefined structure as presented above as a communication medium. As the main goal of the datalink communication network according to the present invention is the provision of tactical and training functions to a fleet of training aircrafts 100, the presented features describe only tactical/training features having the datalink communication network as a backbone. Please note that the features and layout presented below is just one exemplary embodiment of the present invention and various alternatives can be implemented without departing from the inventive concept of the aircraft communication system for establishing a datalink network between participating aircrafts 100.

When Datalink is engaged, the mission computer MC formats event driven squitter messages for transmission by the datalink transponder 12 to enable a limited amount of data to be transferred between participating aircraft 100 for tactical training purposes.

These proprietary messages are turned on and off through a datalink setup page, accessed through a radar page on the multi-function display MFD in the cockpit of the aircraft 100. A foe group can also be selected on this page. All aircrafts in the operators group (those aircraft identified as friends based on their aircraft Flight ID) are colored friendly green by default. Every other aircraft is colored as unknown (amber).

An update rate of greater or equal to 10 Hz may be specified to ensure a good update rate. The bandwidth and update of the datalink network allows at least four aircrafts 100 to engage in a 2v2 training scenario and each aircraft 100 to support basic positional information for 50 aircrafts in total.

Datalink network aircrafts may be designated as targets and used for training missions in the same manner as the simulated aircraft. As the datalink network is two-way, suitably equipped aircrafts may also use the operator's aircraft 100 for similar training purposes.

Message data MD defines tactical training information to be broadcast to other aircraft 100 and shall be encoded in ADS-B Messages M using an Event Driven Protocol.

Figure 3:
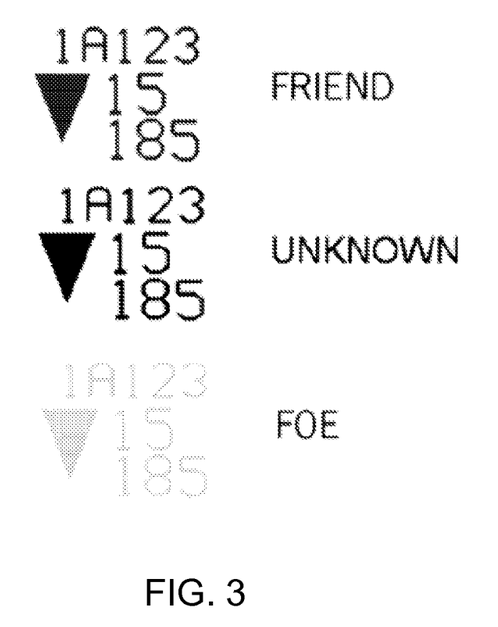
FIG. 3 is a pictorial example of contact symbology of participating and/or nonparticipating aircrafts.

The mission computer MC uses information received through the datalink network to display aircraft 100 information from all datalink network and/or Mode-S equipped aircraft 100. This display includes position data PD such as latitude Lat, longitude Long, altitude Alt, speed and track. In addition the color of the traffic aircraft is indicative of the "threat" level as part of the EW/Radar simulation. An example of such aircraft symbology is shown on FIG. 3.

Figure 4:
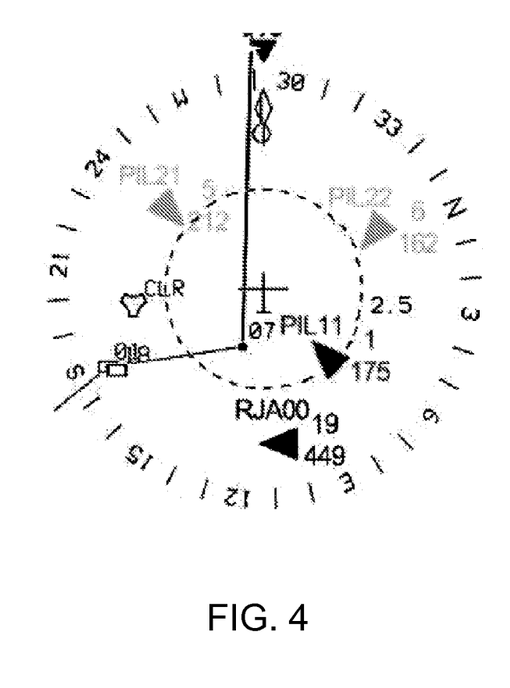
FIG. 4 is an example of a navigation page with aircraft symbology of participating and/or non-participating aircrafts.

The aircraft information is provided as an aid to the pilot in relation to the tactical scenario run through the Radar and EW systems. The information is provided in addition to traffic displays such as TCAD. The symbology is designed to be easily distinguishable from traffic related displays. An example of a navigation page with aircraft symbology for participating and/or non-participating aircrafts 100 is shown on FIG. 4.

The student/trainee acquires radar aircraft via a simulated multifunction display MFD radar display page using Track While Scan (TWS), Range While Scan (RWS), Velocity Search (VS) and Single Target Track (STT) modes of operation, in addition to Air Combat Modes (Boresight and Vertical Scan).

Figure 5:
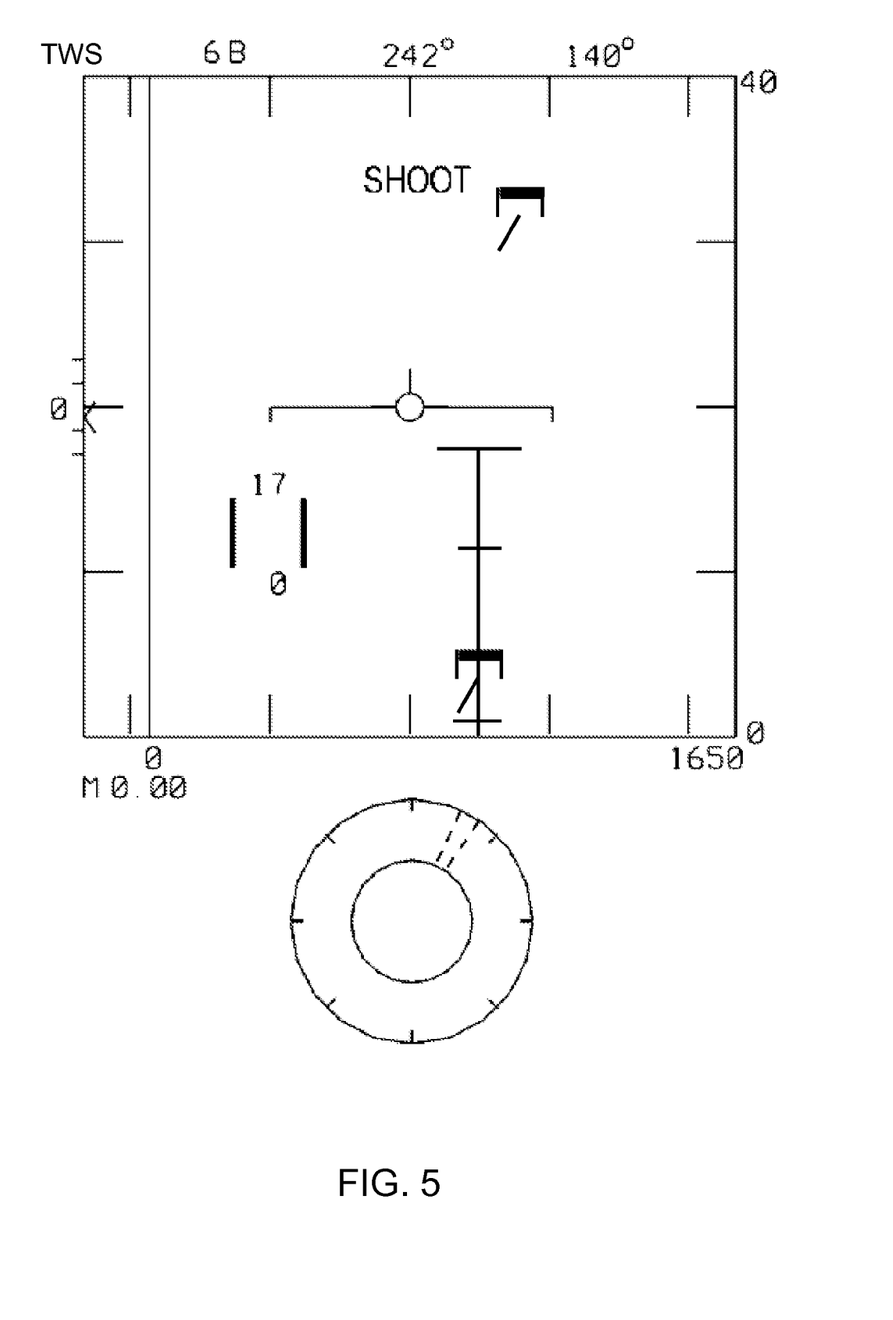
FIG. 5 is a pictorial example of an air to air radar page showing simulated aircraft and/or participating aircrafts.

In addition to the simulated aircrafts 100, the Radar and EW are capable of displaying inputs from the datalink network as Radar plots and EW strobes. All modes of the radar can be used against the datalink network aircrafts 100. Target information from the radar (through the Datalink network) can then be used for a firing solution for the simulated missiles. An example of an air to air radar page showing simulated aircrafts 100 and/or participating aircrafts is depicted on FIG. 5.

A further tactical/training feature that can be implemented using the datalink network is the simulation of warfare. Missile scoring is calculated based on a probability of kill generated by an algorithm internal to the open systems mission computer OSMC. However the probability of kill is determined using the target flight profiles received through the datalink network. Probability of kill is subsequently modified by target deployed countermeasures, where signals are received through the datalink network. If the probability of kill is 50% or greater the system will set the status of the target aircraft 100 to killed at the calculated time of impact. A "killed" aircraft 100 is indicated to all other participant aircrafts 100 through the datalink network. Kill messages M are sent to participating aircrafts 100 to indicate a missile hit.

As described above, various tactical/training features can be implemented based on the datalink network established between participating aircrafts 100 by embedding required data as message data MD into solely messages M complying with the standard communication protocol, thus ensuring that said protocol is not violated by the participant aircrafts 100 and that communication between non-participating aircrafts 200 is not affected.

The datalink network between participating aircrafts 100 uses a modified commercial off-the-shelf system to provide a tactical/training datalink. The datalink provides similarly equipped aircraft 100 the ability to expand the simulated capabilities of the tactical systems for use with human participants.

As may be recognized by those of ordinary skill in the pertinent art based on the teachings herein, numerous changes and modifications may be made to the above-described and other embodiments of the present invention without departing from the scope of the invention as defined in the claims.

What is claimed is:

1. An aircraft communication system for establishing a datalink network between participating aircrafts, each participating aircraft having an ADS-B Mode-S datalink transponder adapted to send and receive ADS-B messages over an ADS-B standard communication protocol, wherein said ADS-B Mode-S datalink transponders establish said datalink network via an ADS-B standard communication protocol by transmitting event driven ADS-B messages having a predefined structure identifying said ADS-B messages as Type 23 ADS-B test messages and including message data, thereby providing a datalink network established by transmission of solely ADS-B messages compliant with said ADS-B standard communication protocol.

2. An aircraft communication system according to claim 1, wherein said predefined structure of the ADS-B messages includes at least one of (i) a type identifier to identify the ADS-B message as a Type 23 ADS-B test message, (ii) a message identifier to identify the ADS-B message as a message generated by a corresponding aircraft communication system, and (iii) a field comprising message data.

3. An aircraft communication system according to claim 2, wherein said field comprising message data includes status data and position data.

4. An aircraft communication system according to claim 3, wherein said status data comprises a tactical status field, a friend status field corresponding to at least one friend designated aircraft and a foe status field corresponding to at least one foe designated aircraft; and said position data comprises an aircraft latitude field, an aircraft longitude field and an aircraft altitude field.

5. An aircraft communication system according to claim 1, wherein each participating aircraft further comprises an open system mission computer connected to a multi-functional display and to the ADS-B Mode-S datalink transponder, and wherein the open system mission computer filters out the message data, from the ADS-B Mode-S datalink transponder, processes said message data and computes information for display on the multi-functional display.

6. An aircraft communication system according to claim 5, wherein each open system mission computer processes data from a global positioning system and an air data computer module and passes said data to the ADS-B Mode-S datalink transponder for transmission thereof.

7. An aircraft communication system according to claim 5, wherein each participating aircraft further comprises a flight management system adapted to set a flight ID classifying the aircraft, and the flight management system is connected to the open system mission computer to broadcast said flight ID via the ADS-B Mode-S datalink transponder over the datalink network.

8. An aircraft communication system according to claim 7, wherein the flight ID set by the flight management system of a respective aircraft comprises a fleet ID uniquely identifying a fleet of aircrafts, and a mission ID uniquely identifying the aircraft within a training mission.

9. A method for establishing a datalink network between participating aircrafts, each having an ADS-B Mode-S datalink transponder adapted to send and receive standard communication signals, the method comprising:

establishing a datalink network between the participating aircrafts using an ADS-B standard communication protocol and transmitting ADS-B messages having a predefined structure to identify said ADS-B messages as Type 23 ADS-B test messages and including message data, thereby establishing the datalink network established by transmission of solely ADS-B messages compliant with said ADS-B standard communication protocol.

10. A method according to claim 9, wherein said predefined structure of the ADS-B messages includes at least one of (i) a type identifier to identify the ADS-B message as a Type 23 ADS-B test message, (ii) a message identifier to identify the ADS-B message as an ADS-B message generated by a corresponding aircraft communication system, and (iii) a field comprising message data.

11. A method according to claim 10, wherein said message data field of the ADS-B message comprises includes status data and position data.

12. A method according to claim 11 wherein said status data comprises a tactical status subfield, a friend status subfield corresponding to at least one friend designated aircraft, and a foe status subfield corresponding to at least one foe designated aircraft; and said position data comprises an aircraft latitude field, an aircraft longitude field and an aircraft altitude field.

13. A method according to claim 9, further comprising the steps of:
 providing each participating aircraft with a flight-management system adapted to set a flight ID classifying the respective aircraft, and
 broadcasting said flight ID via the ADS-B Mode-S datalink transponder over the datalink network.

14. A method according to claim 13, wherein said flight ID comprises a fleet ID uniquely identifying a fleet of aircrafts, and a mission ID uniquely identifying the aircraft within a training mission.

* * * * *